United States Patent
Zhou

(10) Patent No.: US 9,578,613 B2
(45) Date of Patent: Feb. 21, 2017

(54) METHOD AND APPARATUS FOR DETERMINING CLOCK DESYNCHRONIZATION

(71) Applicant: Huawei Technologies Co., Ltd., Shenzhen (CN)

(72) Inventor: Shihui Zhou, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 89 days.

(21) Appl. No.: 14/567,288

(22) Filed: Dec. 11, 2014

(65) Prior Publication Data

US 2015/0092795 A1    Apr. 2, 2015

Related U.S. Application Data

(63) Continuation of application No. PCT/CN2012/087311, filed on Dec. 24, 2012.

(30) Foreign Application Priority Data

Jun. 14, 2012 (CN) .......................... 2012 1 0197793

(51) Int. Cl.
| | |
|---|---|
| *H04W 56/00* | (2009.01) |
| *H04W 24/04* | (2009.01) |
| *H04W 24/10* | (2009.01) |
| *H04W 24/08* | (2009.01) |

(52) U.S. Cl.
CPC ........... *H04W 56/001* (2013.01); *H04W 24/04* (2013.01); *H04W 24/10* (2013.01); *H04W 56/00* (2013.01); *H04W 24/08* (2013.01)

(58) Field of Classification Search
CPC ..... H04J 11/005; H04J 11/003; H04J 11/0056; H04L 5/006; H04L 5/0073; H04L 1/0026; H04W 72/082
See application file for complete search history.

(56) References Cited

U.S. PATENT DOCUMENTS

| | | | |
|---|---|---|---|
| 2010/0215032 A1 | 8/2010 | Jalloul et al. | |
| 2011/0228711 A1 | 9/2011 | Du et al. | |
| 2012/0008511 A1* | 1/2012 | Fan ...................... | H04B 1/7107 370/252 |

(Continued)

FOREIGN PATENT DOCUMENTS

| | | |
|---|---|---|
| CN | 102104474 A | 6/2011 |
| CN | 102387515 A | 3/2012 |

(Continued)

*Primary Examiner* — Jung Park
(74) *Attorney, Agent, or Firm* — Leydig, Voit & Mayer, Ltd.

(57) ABSTRACT

Embodiments of the present invention provide a method and an apparatus for determining clock desynchronization. The method includes: detecting a cell with exceptional IN information or power information among all cells of base stations throughout a network according to network measurement data sent by a base station, and using the cell as a first cell, where the network measurement data includes interference and noise (IN) information or power information; and sorting the first cell according to different types of exceptions of the IN information or power information, so as to determine that one or more of the base stations throughout the network are in clock desynchronization.

30 Claims, 9 Drawing Sheets

(56) References Cited

U.S. PATENT DOCUMENTS

2012/0106390 A1    5/2012  Guo et al.
2014/0024388 A1*  1/2014  Earnshaw ............ H04L 5/0073
                                                         455/452.2

FOREIGN PATENT DOCUMENTS

| CN | 202160283 U | 3/2012 |
| JP | 2010004321 A | 1/2010 |
| JP | 2011233968 A | 11/2011 |
| WO | WO 2010041992 A1 | 4/2010 |

* cited by examiner

METHOD AND APPARATUS FOR DETERMINING CLOCK DESYNCHRONIZATION

CROSS REFERENCE

This application is a continuation of International Patent Application No. PCT/CN2012/087311, filed on Dec. 24, 2012, which claims priority of Chinese Patent Application No. 201210197793.1 filed on Jun. 14, 2012, both of which are hereby incorporated by reference in their entireties

TECHNICAL FIELD

The present invention relates to the field of wireless communication, and in particular, to a method and an apparatus for determining clock desynchronization.

BACKGROUND

A clock reference source is an indispensable function module of a TDD (an acronym of Time Division Duplex) system, and is used to synchronize cells of all base stations throughout a network and avoid uplink/downlink cross timeslot interference caused by desynchronization of the TDD system. The loss of the clock reference source tends to cause clock desynchronization of the TDD system and strong interference between a current cell and an intra-frequency cell of a base station that neighbors the base station of the current cell, which results in that a terminal cannot access the network or leads to deteriorated services such as call drops, handover failures, failures of implementing services, and the like. Deteriorated quality of the wireless communication network affects network user experience directly. The intra-frequency cell of the neighbor base station may be briefly referred to as an intra-frequency neighbor cell.

Generally, after a clock reference source is lost, the base station clock still remains for a time period without causing desynchronization or inter-cell interference, but will drift gradually and eventually lead to clock desynchronization. When a base station is in clock desynchronization, all cells of the base station are clock desynchronization cells. Common clock reference sources include the GPS (an acronym of Global Position System) system, the BeiDou system, and the like.

Generally, in a base station, when a clock reference source is lost, a corresponding alarm prompt will be provided, and a corresponding re-synchronization or reset operation will be performed. On the base station side, after a period of time after the clock reference source is lost, the base station automatically blocks carrier-sectors to prevent the base station from causing interference onto other intra-frequency neighbor cells.

However, the practice of using loss of a clock reference source to indicate whether a base station is in clock desynchronization is not timely or accurate enough, which leads to a delay of response made by the base station, thereby affecting network user experience directly.

SUMMARY

Embodiments of the present invention provide a method and an apparatus for determining clock desynchronization to determine clock desynchronization accurately in time.

In one aspect, a method for determining clock desynchronization is provided, including: detecting a cell with exceptional IN information or power information among all cells of base stations throughout a network according to network measurement data sent by a base station, and using the cell as a first cell, where the network measurement data includes interference and noise IN information or power information; and sorting the first cell according to different types of exceptions of the IN information or power information, so as to determine that one or more of the base stations throughout the network are in clock desynchronization.

In another aspect, an apparatus for determining clock desynchronization is provided, including a first detecting unit and a first determining unit. The first detecting unit is configured to detect a cell with exceptional IN information or power information among all cells of base stations throughout a network according to network measurement data sent by a base station, and use the cell as a first cell, where the network measurement data includes interference and noise IN information or power information; and the first determining unit is configured to sort the first cell, which is detected by the first detecting unit, according to different types of exceptions of the IN information or power information, so as to determine that one or more of the base stations throughout the network are in clock desynchronization.

In another aspect, a method for determining clock desynchronization is provided, including: obtaining network measurement data, where the network measurement data includes interference and noise IN information or power information; detecting a cell with exceptional IN information or power information among cells of a current base station according to the network measurement data: sorting, according to different types of exceptions of the IN information or power information, the detected cell with exceptional IN information or power information among the cells of the current base station, so as to determine that one or more of base stations throughout a network are in clock desynchronization; or sending the network measurement data to a network management node after the network measurement data is obtained, so that the network management node performs the sorting according to different types of exceptions of the IN information or power information, so as to determine a clock desynchronization cell.

In another aspect, a base station for determining clock desynchronization is provided, including an obtaining unit, a detecting unit, a determining unit, and a sending unit. The obtaining unit is configured to obtain network measurement data, where the network measurement data includes interference and noise IN information or power information. The detecting unit is configured to detect a cell with exceptional IN information or power information among cells of a current base station according to the network measurement data obtained by the obtaining unit: the determining unit is configured to sort, according to different types of exceptions of the IN information or power information, the cell detected by the detecting unit as having exceptional IN information or power information among the cells of the current base station, so as to determine that one or more of base stations throughout a network are in clock desynchronization; and the sending unit is configured to send the network measurement data to a network management node after the obtaining unit obtains the network processing data so that the network management node performs the sorting according to different types of exceptions of the IN information or power information, so as to determine a clock desynchronization cell.

With the above technical solution, cells with exceptional IN information (or power information) are detected among all cells, and are sorted according to different types of exceptions of the IN information (or power information) to determine the clock desynchronization of the base station, and the relevant node can take timely actions to prevent the clock desynchronization from affecting communication quality throughout the network.

BRIEF DESCRIPTION OF DRAWINGS

To describe the technical solutions in the embodiments of the present invention more clearly, the following briefly introduces the accompanying drawing required for describing the embodiments of the present invention. Apparently, the accompanying drawing in the following description show merely some embodiments of the present invention, and persons of ordinary skill in the art may still derive other drawings from the accompanying drawing without creative efforts.

DESCRIPTION OF EMBODIMENTS

Figure 1:
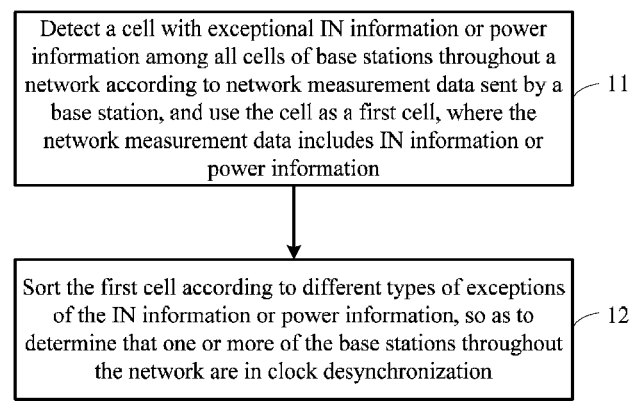
FIG. 1 is a schematic flowchart of a method for determining clock desynchronization according to an embodiment of the present invention.

The following clearly describes the technical solutions in the embodiments of the present invention with reference to the accompanying drawing in the embodiments of the present invention. Apparently, the described embodiments are merely a part rather than all of the embodiments of the present invention. All other embodiments obtained by persons of ordinary skill in the art based on the embodiments in the present invention without creative efforts shall fall within the protection scope of the present invention.

The technical solutions of the present invention are applicable to various TDD communication systems, for example, time division synchronous code division multiple access (TD-SCDMA, Time Division Synchronous Code Division Multiple Access Wireless) and TDD long term evolution (LTE, Long Term Evolution), and the like.

A user equipment (UE, User Equipment) may be also referred to as a mobile terminal (Mobile Terminal), a mobile user equipment, and the like, and is capable of communicating with one or more core networks over a radio access network (for example, RAN, Radio Access Network). The user equipment may be a mobile terminal, such as a mobile phone (or called a "cellular" phone), or a computer with a mobile terminal, for example, a mobile device that is portable, pocket-sized, handheld, built in a computer, or mounted on a vehicle. They exchanges voice and/or data with a radio access network.

A base station may be a NodeB (NodeB) in TD-SCDMA, or an evolved NodeB (eNB or e-NodeB, evolved Node B) in TDD LTE, which is not restricted herein.

Further, the terms "system" and "network" in this document can always be interchanged for use in this document. The term "and/or" in this document is only an association relationship for describing the associated objects, and represents that three relationships may exist, for example, A and/or B may represent the following three cases: A exists separately, both A and B exist, and B exists separately. In addition, the character "/" in this document usually represents that the former and latter associated objects are in a "or" relationship.

In the prior art, a clock reference source depends on a receiver of satellite synchronization signals, and the receiver is called a satellite card. When the satellite card is faulty, the clock source of the base station may still display that the base station is in synchronization, but in fact, the base station is out of synchronization. In this case, no alarm is raised, which is called alarm omission. In addition, a specific time limit is reached after the clock reference source is lost, when a traditional handling way of the base station is to block the carrier-sector (that is, the cell) regardless of whether the clock is in synchronization or desynchronization. If the clock is still synchronized at this time, the handling way of the base station brings an unnecessary communication interruption.

For such a problem, embodiments of the present invention provide a method for determining clock desynchronization to timely detect problems such as low quality of service and call drops that arise from inter-cell interference caused by clock desynchronization, and reduce operation costs. Even if no alarm is raised when the clock source is lost, the clock desynchronization of the base station can still be detected effectively, and further alarm information may be sent and/or the clock reference source may be reset for the clock desynchronization cells automatically. Alternatively, the desynchronization that brings a practical impact is used as a judgment criterion. Even if the clock reference source is lost, the base station is still in clock synchronization at this time and no impact is caused onto the service, and the base station can still run normally. Further, this method is used to determine whether the cell goes on running normally without the need of blocking the cell, thereby reducing operation costs.

FIG. 1 is a schematic flowchart of a method 10 for determining a clock desynchronization cell according to an embodiment of the present invention. As an implementation mode, the implementation subject may be a network management node on a core network side or any of the nodes capable of obtaining network measurement data reported by base stations.

S11. Detect a cell with exceptional IN information or power information among all cells of base stations throughout a network according to network measurement data sent by a base station, and use the cell as a first cell, where the network measurement data includes interference and noise (Interference and Noise, abbreviated as IN) information or power information.

S21. Sort the first cell according to different types of exceptions of the IN information or power information, so as to determine that one or more of the base stations throughout the network are in clock desynchronization.

In the embodiment of the present invention, cells with exceptional IN information (or power information) are detected among all cells, and are sorted according to different types of exceptions of the IN information (or power information) to determine the clock desynchronization of the base station, and the relevant node can take timely actions to prevent the clock desynchronization from affecting communication quality throughout the network.

Optionally, the method further includes: detecting a cell with exceptional IN information or power information among intra-frequency neighbor cells of a base station adjacent to the base station of the first cell, and using the cell as a second cell; and sorting the first cell and the second cell according to different types of exceptions of the IN information or power information, so as to determine a clock desynchronization cell.

Optionally, the detecting a cell with exceptional IN information or power information includes: detecting a cell where an uplink fore part of IN information or power information encounters an exception, or a cell where an uplink aft part of IN information or power information encounters an exception.

Optionally, the cell where the uplink fore part of IN information or power information encounters an exception includes: a cell, where a difference between the IN information or power information of a fore symbol in an uplink frame of the cell and the IN information or power information of an aft symbol in the uplink frame exceeds a threshold; or a cell, where a difference between the IN information or power information of an uplink pilot timeslot UpPTS of the cell and the IN information or power information of an aft symbol in an uplink frame exceeds a threshold; or a cell, where a difference between the IN information or power information of an uplink-downlink synchronization guard period GP of the cell and the IN information or power information of an aft symbol in an uplink frame exceeds a threshold.

Optionally, the cell where the uplink aft part of IN information or power information encounters an exception includes: a cell, where a difference between the IN information or power information of an aft symbol in an uplink frame of the cell and the IN information or power information of a fore symbol in the uplink frame exceeds a threshold; or a cell, where a difference between the IN information or power information of an aft symbol in an uplink frame of the cell and the IN information or power information of an uplink pilot timeslot UpPTS exceeds a threshold; or a cell, where a difference between the IN information or power information of an aft symbol in an uplink frame of the cell and the IN information or power information of an uplink-downlink synchronization guard period GP exceeds a threshold.

Optionally, the sorting the first cell according to different types of exceptions of the IN information or power information so as to determine that one or more of the base stations throughout the network are in clock desynchronization includes: determining, if an uplink fore part of IN information or power information of at least one of the first cells encounters an exception, that one or more of the base stations throughout the network are suspected of clock desynchronization, and that the at least one first cell suffers from suspected clock desynchronization interference; or, determining, if an uplink aft part of IN information or power information of at least one of the first cells encounters an exception, that one or more of the base stations throughout the network are in clock desynchronization, and that the at least one first cell suffers clock desynchronization interference.

Optionally, the sorting the first cell and the second cell according to different types of exceptions of the IN information or power information so as to determine a clock desynchronization cell includes: after determining, if an uplink fore part of IN information or power information of at least one of the first cells encounters an exception, that one or more of the base stations throughout the network are suspected of clock desynchronization, and that the at least one first cell suffers suspected clock desynchronization interference; the method further includes: if only the at least one first cell encounters an exception in the uplink fore part of IN information or power information, more than two of the second cells encounter an exception in an uplink aft part of IN information or power information and the more than two second cells belong to different base stations adjacent to a base station of the at least one first cell, determining that the base station of the at least one first cell is in clock desynchronization and that the at least one first cell is a clock desynchronization cell; or, after determining, if an uplink aft part of IN information or power information of at least one of the first cells encounters an exception, that one or more of the base stations throughout the network are in clock desynchronization, and that the at least one first cell suffers clock desynchronization interference; the method further includes: if only the at least one first cell encounters an exception in the uplink aft part of IN information or power information, more than two of the second cells encounter an exception in an uplink fore part of IN information or power information and the more than two second cells belong to different base stations adjacent to a base station of the at least one first cell, determining that the base station of the at least one first cell is in clock desynchronization and that the first cell is a clock desynchronization cell.

Optionally, after determining the first cell as a clock desynchronization cell, the method further includes: sending a clock source reset command or alarm information to the base station of the at least one first cell when the at least one first cell is determined as a clock desynchronization cell.

Figure 2:
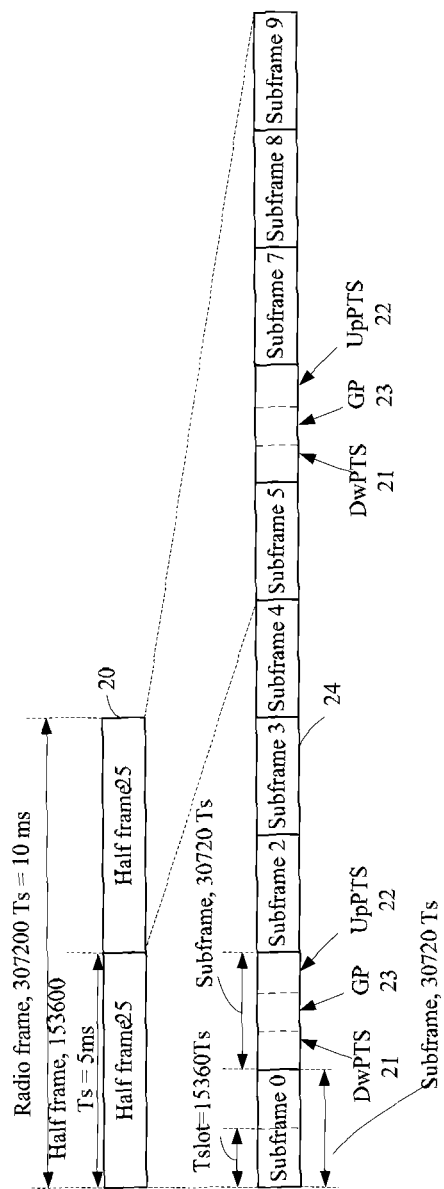
FIG. 2 is a schematic structural diagram of a TDD LTE radio frame.

To facilitate description, the embodiment of the present invention uses TDD LTE as an example. FIG. 2 is a schematic structural diagram of a TDD LTE radio frame 20. To simplify the description, a frame structure of TDD LTE in the prior is selected, which, however, is not limited herein.

As shown in FIG. 2, the parameters are described below.

DwPTS: downlink pilot timeslot, which is used for downlink synchronization;

UpPTS: uplink pilot timeslot, which is used for uplink synchronization; and

GP: guard period between uplink and downlink synchronization.

A radio frame 20 includes two half frames 25. Each radio frame may include ten subframes 24 that are numbered from 0 to 9. Subframe 1 is a special subframe, and includes a DwPTS 21, an UpPTS 22, and a GP 23; subframes 0, 2, 3, 4, and 5 are ordinary subframes, where subframe 0 is necessarily a downlink subframe (D), and other subframes may serve as uplink subframes (U) or downlink subframes depending on the actual scenario. On a time domain, an ordinary CP (an acronym of Cyclic Prefix) of each subframe may be subdivided into 14 symbols, and an extended CP has 12 symbols.

Figure 3:
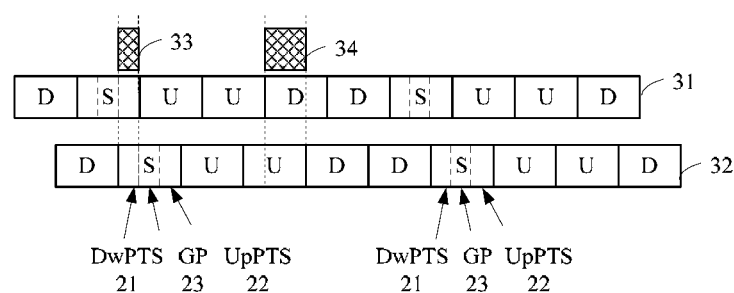
FIG. 3 is a schematic diagram of exceptional IN information or power information for determining clock desynchronization according to an embodiment of the present invention.
Figure 4:
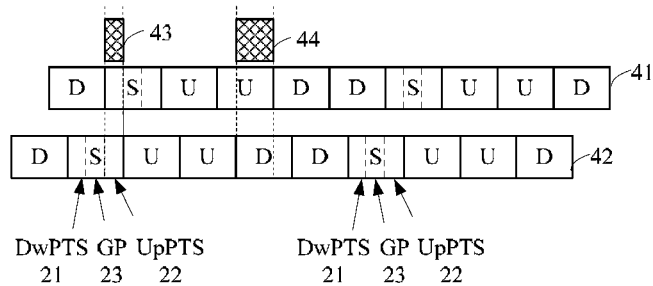
FIG. 4 is a schematic diagram of exceptional IN information or power information for determining clock desynchronization according to another embodiment of the present invention.

A faulty base station caused by clock desynchronization is hereinafter referred to as a clock desynchronization site, and its interference onto an intra-frequency neighbor site primarily comes in two forms, which are shown in FIG. 3 and FIG. 4 respectively.

FIG. 3 is a schematic diagram of exceptional IN information or power information for determining clock desynchronization according to an embodiment of the present invention. In FIG. 3, 31 is a radio frame of a clock desynchronization site, 32 is a radio frame of an intra-frequency neighbor site, 33 indicates severe interference on an uplink fore symbol of the clock desynchronization site, and 34 indicates severe interference on an uplink aft symbol of the intra-frequency neighbor site. If the clock desynchronization site is N milliseconds ahead of other cells, the uplink fore part of each radio frame receives interference from the intra-frequency neighbor base station, while the uplink aft part of each radio frame of the intra-frequency neighbor base station receives interference.

FIG. 4 is a schematic diagram of exceptional IN information or power information for determining clock desynchronization according to another embodiment of the present invention. In FIG. 4, 41 is a radio frame of a clock desynchronization site, 42 is a radio frame of an intra-frequency neighbor site, 43 indicates severe interference on an uplink fore symbol of the intra-frequency neighbor site, and 44 indicates severe interference on an uplink aft symbol of the clock desynchronization site. If the clock desynchronization site is N milliseconds behind other cells, the uplink aft part of each radio frame receives interference from the intra-frequency neighbor base station, while the uplink fore part of each radio frame of the intra-frequency neighbor base station receives interference.

In a case that the IN information or power information is exceptional due to clock desynchronization, network measurement data such as traffic measurement data, CHR (an acronym of Call History Record) will record such characteristics, and the recorded information includes the following contents:

(1) IN information (or power information) of a fore symbol in an uplink frame;

(2) IN information (or power information) of an aft symbol in an uplink frame;

(3) IN information (or power information) of an UpPTS; and (4) IN information (or power information) of a GP.

Note that the recorded IN information (or power information) of a GP is not the IN information (or power information) of the whole GP. Considering the uplink and downlink receiving, transmitting, and conversion, it is not practicable to record the IN information (or power information) of the whole GP. It is appropriate to record only the IN information (or power information) in the last part of the GP, for example, record the IN information of the last symbol of the GP.

According to the network measurement data provided above, it is practicable to determine whether the IN information or power information of a cell is exceptional, and a distinct type of the exception. Types of exceptions of exceptional IN information or power information caused by clock desynchronization include: scenarios where only an uplink fore part of the IN information (or power information) of a cell encounters an exception, scenarios where only an uplink aft part of the IN information (or power information) of a cell encounters an exception, and scenarios where the IN information (or power information) of a cell encounters no exception.

The scenarios where only an uplink fore part of IN information (or power information) of a cell encounters an exception include:

(1) A difference between the IN information (or power information) of a fore symbol in an uplink frame and the IN information (or power information) of an aft symbol in the uplink frame exceeds threshold A;

(2) A difference between the IN information (or power information) of an UpPTS and the IN information (or power information) of an aft symbol in the uplink frame exceeds threshold A; and (3) A difference between the IN of a GP and the IN information (or power information) of an aft symbol in the uplink frame exceeds threshold A.

The scenarios where only an uplink aft part of the IN information (or power information) of a cell encounters an exception include:

(1) A difference between the IN information (or power information) of an aft symbol in an uplink frame and the IN information (or power information) of a fore symbol in the uplink frame exceeds threshold A;

(2) A difference between the IN information (or power information) of an aft symbol in the uplink frame and the IN information (or power information) of an UpPTS exceeds threshold A; and (3) A difference between the IN information (or power information) of an aft symbol in the uplink frame and the IN information (or power information) of a GP exceeds threshold A.

The scenarios where the IN information (or power information) of a cell encounters no exception include:

(1) The IN information (or power information) of the cell is normal, and the cell receives no interference;

(2) The IN information (or power information) of the cell is high, but the fore part and the aft part are basically consistent, and the difference between them does not exceed threshold A.

Threshold A is also called a threshold value in the context, and the threshold value may be a specified value or a default value, and the like.

Figure 5:
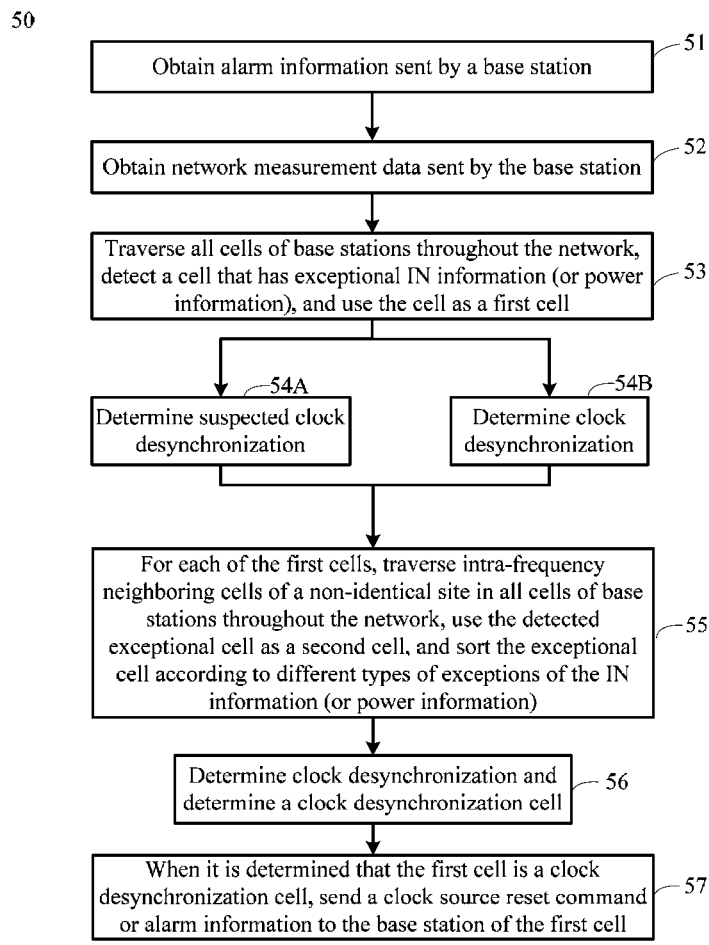
FIG. 5 is a schematic flowchart of a method for determining clock desynchronization according to another embodiment of the present invention.

According to different types of exceptional IN information or power information in the embodiments of the present invention, which are shown in FIG. 3 and FIG. 4, the method 10 for determining clock desynchronization may be executed. In addition, FIG. 5 is a schematic flowchart of a method 50 for determining clock desynchronization according to another embodiment of the present invention. By using the method to determine a clock desynchronization cell in the base stations throughout the network, the specific the clock desynchronization of the base station throughout the network may be further found. As an implementation mode, the device for executing the method 50 may be a network management node on a core network side or any node capable of obtaining network measurement data reported by each base station.

S51. Obtain alarm information sent by a base station.

This step is optional, and may be performed after or concurrently with S52. The alarm information is used to indicate that the base station has detected clock desynchronization in one or more of the base stations throughout the network. The alarm information does not tell which specific base station is in clock desynchronization, and further relevant detection is required.

S52. Obtain network measurement data sent by the base station.

Information may be exchanged between a network management system and the base station directly or indirectly, which is not restricted herein.

S53. Traverse all cells of base stations throughout the network, detect a cell that has exceptional IN information (or power information), and use the cell as a first cell.

Interference characteristics of exceptional IN information (or power information) caused by clock desynchronization are obviously different from interference characteristics of exceptional IN information (or power information) caused by other interference. To judge whether the clock is out of synchronization, it is only necessary to detect the following two types of cells whose IN information (or power information) characteristics are exceptional:

1) The IN information (or power information) in an uplink fore part of the cell is exceptional. In this case, the interference may be caused by clock desynchronization or by ultra-far smearing of a TDD system. In this case, it is determined that the cell is suspected of clock desynchronization and receives interference from the suspected clock desynchronization, and thereby, it is determined that one or more base stations throughout the network are suspected of clock desynchronization, and then S54A is performed.

2) The IN information (or power information) in an uplink aft part of the cell is exceptional. With the exceptional IN information (or power information) in this scenario, it is appropriate to directly determine that the cell interference is caused by clock desynchronization, and thereby, it is determined that one or more of the base stations throughout the network are in clock desynchronization, and then S54B is performed.

The above two IN information (or power information) exception characteristics are only helpful for judging whether a cell receives clock desynchronization interference. Further, the faulty cell, that is, the clock desynchronization cell needs to be found.

A cell with exceptional IN information (or power information), which is detected in step S53, is also called a first cell. There may be one or more first cells. Multiple first cells may belong to one base station or different base stations. When one of the first cells is determined as a clock desynchronization cell, the base station of the first cell may be determined as in clock desynchronization, and all cells under the base station are clock desynchronization cells.

S55. Subsequently, for each of the first cells, traverse intra-frequency neighbor cells of a non-identical site (that is, a neighbor base station) in all cells of base stations throughout the network, use the detected exceptional cell as a second cell, and sort the exceptional cell according to different types of exceptions of the IN information or power information.

Traverse the intra-frequency neighbor cell of the non-identical site, and use the exceptional cell, which is detected according to the two interference types in S53, as a second cell. Afterward, sort all exceptional cells, including the first cell and the second cell.

It is assumed that the first cell include cell A. After the cells are sorted according to different types of exceptions of the IN information (or power information), the following specific scenarios are included:

1) If only cell A has exceptional IN in an uplink fore part, and more than 2 of the intra-frequency neighbor cells of the neighbor base station of cell A, that is, second cells relative to cell A, have exceptional IN in an uplink aft part, and the two cells belong to different base stations adjacent to the base station of cell A, it is determined that cell A is a clock desynchronization cell, and S56 is performed; if the two cells belong to the same base station adjacent to the base station of cell A, possible scenarios include mutual interference between base stations, and it cannot be determined whether cell A is in clock desynchronization directly.

This scenario further analyzes a cell suspected of clock desynchronization in step S53, and finds the clock desynchronization of the base station throughout the network by finally confirming whether the cell is in clock desynchronization.

2) If only cell A has exceptional IN in an uplink aft part, and more than 2 of the intra-frequency neighbor cells of the neighbor base station of cell A, that is, second cells relative to cell A, have exceptional IN in an uplink fore part, it is determined that cell A is a clock desynchronization cell, and S56 is performed; if the two cells belong to the same base station adjacent to the base station of cell A, possible scenarios include mutual interference between base stations, and it cannot be determined whether cell A is in clock desynchronization directly.

This scenario further analyzes the scenario of confirming the clock desynchronization of the base station throughout the network in step S53, thereby confirming a clock desynchronization cell and finding the clock desynchronization of the base station.

S54A. Determine a base station suspected of clock desynchronization throughout the network. S54B. Determine a clock desynchronization of the base station throughout the network.

S56. Determine a clock desynchronization cell.

3) If cell A and all neighbor cells have IN exception in an uplink fore part, it is determined that interference received by cell A is not caused by clock desynchronization; if cell A has no neighbor cell, suspected clock desynchronization is determined, and cell A receives interference from the suspected clock desynchronization, and optionally, S54A is performed, or manual analysis is further performed to determine whether cell A is in clock desynchronization.

4) In other scenarios, it is determined that cell A receives clock desynchronization interference, but cell A is not necessarily a clock desynchronization cell, and S54A is performed.

S57. When it is determined that the first cell is a clock desynchronization cell, send a clock source reset command or alarm information to the base station of the first cell.

Optionally, a network management system may send a clock source reset command or alarm information to a specific base station to make the base station respond accurately in time. Optionally, the network management system may also send the clock source reset command or alarm information when the first cell is a suspected clock desynchronization cell, for example, after step S53; and manual analysis may be performed to further determine whether the base station of the first cell is in clock desynchronization.

In the embodiment of the present invention, based on network measurement data, and the clock desynchronization site is determined by considering that the interference characteristic of an exceptional cell is completely contrary to the interference characteristic of a neighbor cell interfered by the cell. Further, for a clock desynchronization site, alarm information may be sent and/or the clock reference source may be reset; or, further, when the clock reference source is lost, this method may be used to decide whether the exceptional cell goes on running normally instead of being blocked, and the clock may even be corrected roughly.

In the embodiment of the present invention, cells with exceptional IN information (or power information) are detected among all cells, and are sorted according to different types of exceptions of the IN information (or power information) to determine the clock desynchronization of the base station, and the relevant node can take timely actions to prevent the clock desynchronization from affecting communication quality throughout the network.

Figure 6A:
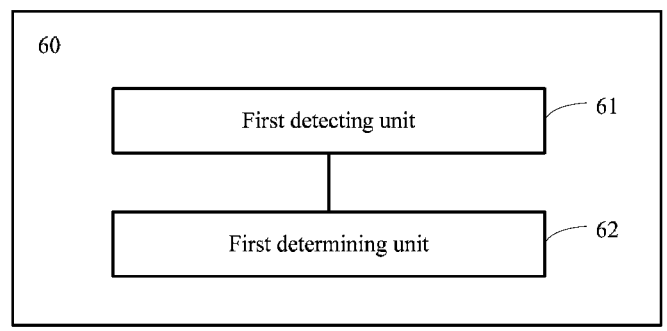
FIG. 6A and FIG. 6B are schematic block diagrams of an apparatus for determining clock desynchronization according to an embodiment of the present invention.
Figure 6B:
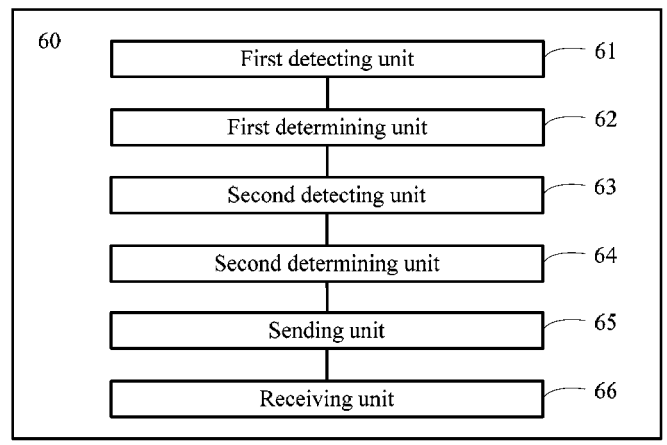

FIG. 6A and FIG. 6B are schematic block diagrams of an apparatus 60 for determining clock desynchronization according to an embodiment of the present invention.

The apparatus 60 includes a first detecting unit 61 and a first determining unit 62.

The detecting unit 61 detects a cell with exceptional IN information or power information among all cells of base stations throughout a network according to network measurement data sent by a base station, and uses the cell as a first cell, where the network measurement data includes interference and noise IN information or power information.

The first determining unit 62 sorts the first cell, which is detected by the first detecting unit 61, according to different types of exceptions of the IN information or power information, so as to determine that one or more of the base stations throughout the network are in clock desynchronization.

With the apparatus for determining clock desynchronization in the embodiment of the present invention, cells with exceptional IN information (or power information) are detected among all cells, and are sorted according to different types of exceptions of the IN information or power information to determine the clock desynchronization, and the relevant node can take timely actions to prevent the clock desynchronization from affecting communication quality throughout the network.

Optionally, as another embodiment, according to the apparatus 60 shown in FIG. 6B, the apparatus 60 may further include a second detecting unit 63, a second determining unit 64, a sending unit 65, and a receiving unit 66.

Optionally, the second detecting unit 63 detects a cell with exceptional IN information or power information among intra-frequency neighbor cells of a base station adjacent to the base station of the first cell according to the network measurement data sent by the base station, and uses the cell as a second cell.

Optionally, the second determining unit 64 sorts, according to different types of exceptions of the IN information or power information, the first cell detected by the first detecting unit 61 and the second cell detected by the second detecting unit, so as to determine a clock desynchronization cell.

Optionally, the first detecting unit 61 detects a cell that has exceptional IN information or power information in an uplink fore part of the cell, or a cell that has exceptional IN information or power information in an aft part of the cell, among all cells of the base stations throughout the network, and uses the cell as a first cell; the second detecting unit 63 detects a cell that has exceptional IN information or power information in an uplink fore part of the cell, or a cell that has exceptional IN information or power information in an aft part of the cell, among intra-frequency neighbor cells of a base station adjacent to the base station of the first cell, and uses the cell as a second cell.

Optionally, the cell that has exceptional IN information or power information in the uplink fore part of the cell, which is detected by the first detecting unit 61 or the second detecting unit 63, includes: a cell, where a difference between the IN information or power information of a fore symbol in an uplink frame of the cell and the IN information or power information of an aft symbol in the uplink frame exceeds a threshold; a cell, where a difference between the IN information or power information of an uplink pilot timeslot UpPTS of the cell and the IN information or power information of an aft symbol in an uplink frame exceeds a threshold; or a cell, where a difference between the IN information or power information of an uplink-downlink synchronization guard period GP of the cell and the IN information or power information of an aft symbol in an uplink frame exceeds a threshold.

Optionally, the cell that has exceptional IN information or power information in the uplink aft part of the cell, which is detected by the first detecting unit 61 or the second detecting unit 63, includes: a cell, where a difference between the IN information or power information of an aft symbol in an uplink frame of the cell and the IN information or power information of a fore symbol in the uplink frame exceeds a threshold; a cell, where a difference between the IN information or power information of an aft symbol in an uplink frame of the cell and the IN information or power information of an uplink pilot timeslot UpPTS exceeds a threshold; or a cell, where a difference between the IN information or power information of an aft symbol in an uplink frame of the cell and the IN information or power information of an uplink-downlink synchronization guard period GP exceeds a threshold.

Optionally, the first determining unit is specifically configured to: if an uplink fore part of at least one of the first cells has exceptional IN information or power information, determine that one or more of the base stations throughout the network are suspected of clock desynchronization, and that the at least one first cell suffers suspected clock desynchronization interference; or, if an uplink aft part of at least one of the first cells has exceptional IN information or power information, determine that one or more of the base stations throughout the network are in clock desynchronization, and that the at least one first cell receives clock desynchronization interference.

Optionally, the second determining unit is specifically configured to: if an uplink fore part IN information or power information of only at least one of the first cells encounters an exception, an uplink aft part IN information or power information of more than two of the second cells encounters an exception, and the more than two second cells belong to different base stations adjacent to the base station of the at least one first cell, determine that the at least one first cell is a clock desynchronization cell; if an uplink aft part of IN information or power information of only at least one of the first cells encounters an exception, an uplink fore part of IN information or power information of more than two of the second cells encounters an exception, and the more than two second cells belong to different base stations adjacent to the base station of the at least one first cell, determine that the at least one first cell is a clock desynchronization cell.

Optionally, the sending unit 65 sends a clock source reset command or alarm information to the base station of the at least one first cell when the second determining unit determines that the at least one first cell is a clock desynchronization cell.

Optionally, the receiving unit 66 receives the alarm information sent by the base station, where the alarm information is used to indicate that the base station has detected clock desynchronization in one or more of the base stations throughout the network.

The apparatus 60 implements the method 10 and the method 50. For brevity, details are not given here any further.

Figure 7:
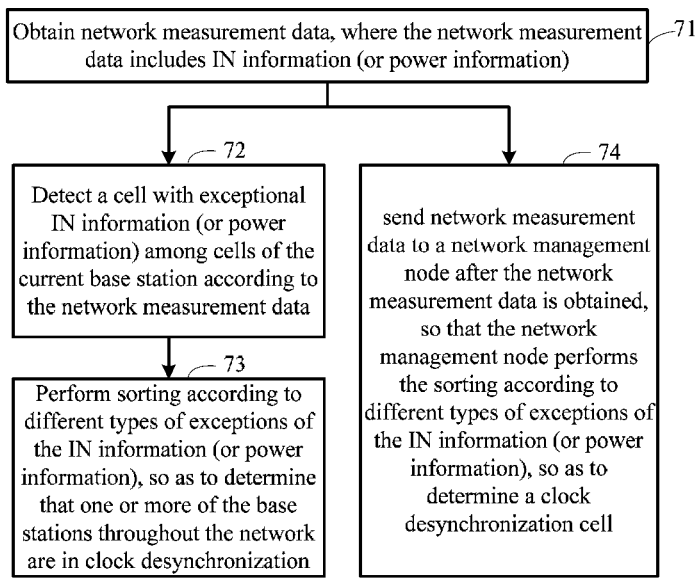
FIG. 7 is a schematic flowchart of another method for determining clock desynchronization according to an embodiment of the present invention.

The method for determining clock desynchronization may also be performed by other apparatuses such as a base station. FIG. 7 is a schematic flowchart of another method 70 for determining clock desynchronization according to an embodiment of the present invention.

S71. Obtain network measurement data, where the network measurement data includes interference and noise IN information or power information.

S72. Detect a cell with exceptional IN information or power information among cells of the current base station according to the network measurement data.

S73. Sort, according to different types of exceptions of the IN information or power information, the detected cell with exceptional IN information or power information among cells of the current base station, so as to determine that one or more of the base stations throughout the network are in clock desynchronization.

Or, S74, send network measurement data to a network management node after the network measurement data is obtained, so that the network management node performs the sorting according to different types of exceptions of the IN information or power information, so as to determine a clock desynchronization cell.

In the embodiment of the present invention, cells with exceptional IN information (or power information) are detected among all cells, and are sorted according to different types of exceptions of the IN information (or power information) to determine the clock desynchronization of the base station, and the relevant node can take timely actions to prevent the clock desynchronization from affecting communication quality throughout the network.

Optionally, after sorting, according to different types of exceptions of the IN information or power information, the detected cell with exceptional IN information or power information among cells of the current base station, so as to determine that one or more of the base stations throughout the network are in clock desynchronization; the method further includes: sending alarm information to the network management node, where the alarm information is used to indicate that the base station has detected clock desynchronization in one or more of the base stations throughout the network.

Optionally, the detecting a cell that has exceptional IN information or power information among cells of the current base station includes: detecting a cell where an uplink fore part of IN information or power information encounters an exception, and sorting the detected cell according to different types of exceptions of the IN information or power information, so as to determine that one or more of the base stations throughout the network are suspected of clock desynchronization; or, detecting a cell where an uplink aft part of IN information or power information encounters an exception among cells of the current base station, and sorting the detected cell according to different types of exceptions of the IN information or power information, so as to determine that one or more of the base stations throughout the network are in clock desynchronization.

Optionally, the cell where the uplink fore part of IN information or power information encounters an exception includes: a cell, where a difference between the IN information or power information of a fore symbol in an uplink frame of the cell and the IN information or power information of an aft symbol in the uplink frame exceeds a threshold; or, a cell, where a difference between the IN information or power information of an uplink pilot timeslot UpPTS of the cell and the IN information or power information of an aft symbol in an uplink frame exceeds a threshold; or, a cell, where a difference between the IN information or power information of an uplink-downlink synchronization guard period GP of the cell and the IN information or power information of an aft symbol in an uplink frame exceeds a threshold.

Optionally, the cell where the uplink fore part of IN information or power information encounters an exception includes: a cell, where a difference between the IN information or power information of an aft symbol in an uplink frame of the cell and the IN information or power information of a fore symbol in the uplink frame exceeds a threshold; a cell, where a difference between the IN information or power information of an aft symbol in an uplink frame of the cell and the IN information or power information of an uplink pilot timeslot UpPTS exceeds a threshold; or a cell, where a difference between the IN information or power information of an aft symbol in an uplink frame of the cell and the IN information or power information of an uplink-downlink synchronization guard period GP exceeds a threshold.

Optionally, after sending network measurement data to a network management node, so that the network management node performs the sorting according to different types of exceptions of the IN information or power information, so as to determine the clock desynchronization cell; the method further includes: receiving, by the base station, the clock source reset command or alarm information from the network management node when the network management node determines that the first cell in the base station is a clock desynchronization cell.

Figure 8:
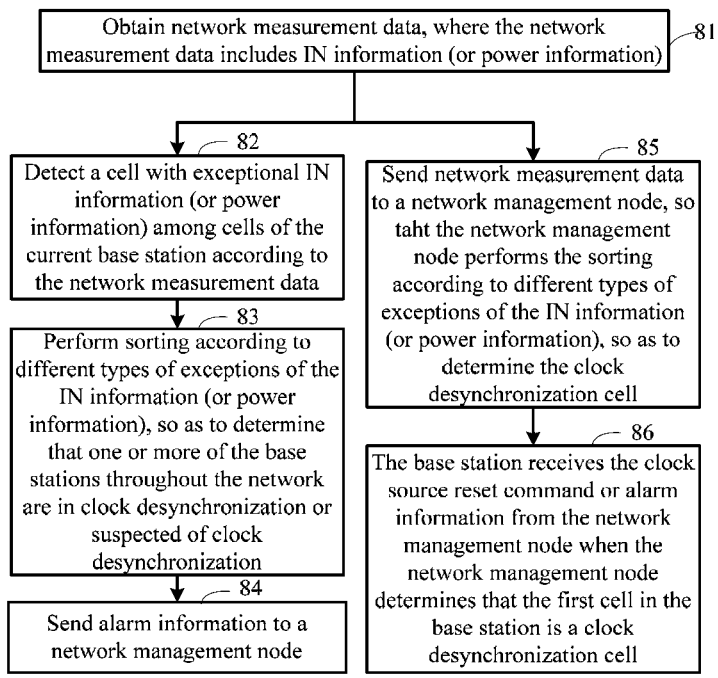
FIG. 8 is a schematic flowchart of a method for determining clock desynchronization according to another embodiment of the present invention.

Optionally, FIG. 8 is a schematic flowchart of a method 80 for determining clock desynchronization according to another embodiment of the present invention. As an exemplary way of implementation, the method 80 is implemented by a base station.

S81. Obtain network measurement data, where the network measurement data includes interference and noise (IN) information or power information.

The base station may obtain the network measurement data from a UE.

S82. Detect a cell with exceptional IN information or power information among cells of the current base station according to the network measurement data.

The method used by the base station to detect a cell with exceptional IN information or power information is similar to the method 10 and the method 50, and may also make use of the scenarios of exceptional IN information or power information shown in FIG. 3 and FIG. 4.

S83. Sort, according to different types of exceptions of the IN information or power information, the detected cell with exceptional IN information or power information among cells of the current base station, so as to determine that one or more of the base stations throughout the network are in clock desynchronization or suspected of clock desynchronization.

Detect a cell where an uplink fore part of IN information or power information encounters an exception among cells of the current base station, and sort the detected cell according to different types of exceptions of the IN information or power information, so as to determine that one or more of the base stations throughout the network are suspected of clock desynchronization; or, detect a cell were an uplink aft part of IN information or power information encounters an exception among cells of the current base station, and sort the detected cell according to different types of exceptions of the IN information or power information, so as to determine that one or more of the base stations throughout the network are in clock desynchronization. For the cell where an uplink fore part of IN information or power information encounters an exception, and the cell where an uplink aft part of IN information or power information encounters an exception, reference may be made to the embodiment of the method 50.

Unlike the method which uses a node such as a network management node to determine clock desynchronization, when a base station can obtain only its own network measurement data, the base station can determine only clock desynchronization or suspected clock desynchronization of base stations in the system, and cannot further determine a clock desynchronization cell, and therefore cannot further determine which clock in the current base station or other base stations is out of synchronization. Optionally, when a base station can obtain network measurement data of other base stations, for example, perform centralized control, the base station may be equivalent to a network management node.

Optionally, S84, send alarm information to a network management node, where the alarm information is used to indicate that the base station has detected clock desynchronization in one or more of the base stations throughout the network.

As an optional embodiment, S85, send network measurement data to a network management node after the network measurement data is obtained, so that the network management node performs the sorting according to different types of exceptions of the IN information or power information, so as to determine the clock desynchronization cell. Optionally, after the network measurement data is obtained, the base station may omit S83 and give up determining clock desynchronization, or may send the network measurement data to the apparatus 60 shown in FIG. 6A or FIG. 6B while determining the clock desynchronization. The apparatus 60 may determine the clock desynchronization in the way described above. For details, reference may be made to the embodiments in the method 10 and the method 50.

Afterward, optionally, S86, the base station receives the clock source reset command or alarm information from the network management node when the network management node determines that the first cell in the base station is a clock desynchronization cell.

The base station exchanges alarm information with the network management system. After the alarm information is received, the specific actions to be taken may depend on the specific node.

In the embodiment of the present invention, cells with exceptional IN information (or power information) are detected among all cells, and are sorted according to different types of exceptions of the IN information (or power information) to determine the clock desynchronization of the base station, and the relevant node can take timely actions to prevent the clock desynchronization from affecting communication quality throughout the network.

Figure 9A:
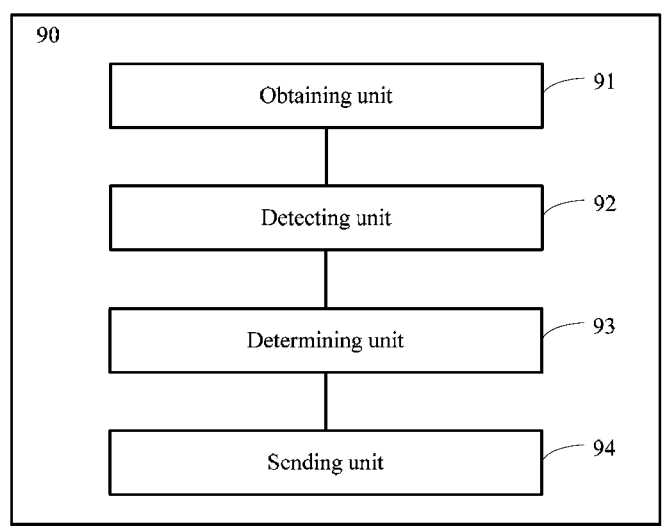
FIG. 9A and FIG. 9B are schematic block diagrams of a base station for determining clock desynchronization according to an embodiment of the present invention.

FIG. 9A is a schematic block diagram of a base station 90 for determining clock desynchronization according to an embodiment of the present invention.

The base station 90 includes an obtaining unit 91, a detecting unit 92, a determining unit 93, and optionally, a sending unit 93.

The obtaining unit 91 is configured to obtain network measurement data, where the network measurement data includes interference and noise (IN) information or power information.

The detecting unit 92 detects a cell with exceptional IN information or power among cells of the current base station according to the network measurement data obtained by the obtaining unit 91.

The determining unit 93 sorts, according to different types of exceptions of the IN information or power information, the cell detected by the detecting unit 92 as having exceptional IN information or power information among cells of the current base station, so as to determine that one or more of the base stations throughout the network are in clock desynchronization.

Alternatively, the sending unit 94 sends network measurement data to a network management node after the obtaining unit 91 obtains the network processing data, so that the network management node performs the sorting according to different types of exceptions of the IN information or power information, so as to determine a clock desynchronization cell.

With the apparatus for determining clock desynchronization in the embodiment of the present invention, cells with exceptional IN information (or power information) are detected among all cells, and are sorted according to different types of exceptions of the IN information (or power information) to determine the clock desynchronization of the base station, and the relevant node can take timely actions to prevent the clock desynchronization from affecting communication quality throughout the network.

Optionally, after the determining unit sorts, according to different types of exceptions of the IN information or power information, the cell detected by the detecting unit as having exceptional IN information or power information among cells of the current base station, so as to determine that one or more of the base stations throughout the network are in clock desynchronization, the sending unit further sends alarm information to the network management node, where the alarm information is used to indicate that the base station has detected clock desynchronization in one or more of the base stations throughout the network.

Optionally, the detecting unit is specifically configured to: detect a cell where an uplink fore part of IN information or power information encounters an exception among cells of the current base station, and sort the detected cell according to different types of exceptions of the IN information or power information, so as to determine that one or more of the base stations throughout the network are suspected of clock desynchronization; or, detect a cell where an uplink aft part of IN information or power information encounters an exception among cells of the current base station, and sort the detected cell according to different types of exceptions of the IN information or power information, so as to determine that one or more of the base stations throughout the network are in clock desynchronization.

Optionally, the cell detected by the detecting unit as encountering an exception in the uplink fore part of IN information or power information includes: a cell, where a difference between the IN information or power information of a fore symbol in an uplink frame of the cell and the IN information or power information of an aft symbol in the uplink frame exceeds a threshold; or, a cell, where a difference between the IN information or power information of an uplink pilot timeslot UpPTS of the cell and the IN information or power information of an aft symbol in an uplink frame exceeds a threshold; or, a cell, where a difference between the IN information or power information of an uplink-downlink synchronization guard period GP of the cell and the IN information or power information of an aft symbol in an uplink frame exceeds a threshold.

Optionally, the cell detected by the detecting unit as encountering an exception in the uplink fore part of IN information or power information includes: a cell, where a difference between the IN information or power information of an aft symbol in an uplink frame of the cell and the IN information or power information of a fore symbol in the uplink frame exceeds a threshold; or, a cell, where a difference between the IN information or power information of an aft symbol in an uplink frame of the cell and the IN information or power information of an uplink pilot timeslot UpPTS exceeds a threshold; or, a cell, where a difference between the IN information or power information of an aft symbol in an uplink frame of the cells and the IN information or power information of an uplink-downlink synchronization guard period GP exceeds a threshold.

Figure 9B:
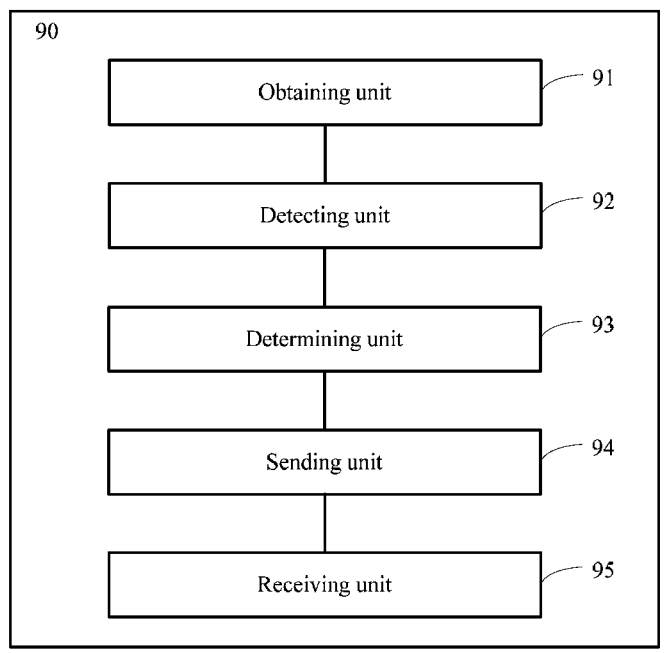

Optionally, FIG. 9B is a schematic block diagram of a base station 90 for determining clock desynchronization cells according to another embodiment of the present invention. As shown in FIG. 9B, the base station 90 may further include a receiving unit 95.

After network measurement data is sent to a network management node, so that the network management node performs the sorting according to different types of exceptions of the IN information or power information so as to determine the clock desynchronization cell, the receiving unit 95 receives the clock source reset command or alarm information from the network management node when the network management node determines that the first cell in the base station is a clock desynchronization cell.

The base station 90 implements the method 70 and the method 80. For brevity, details are not given here any further.

With the apparatus for determining clock desynchronization in the embodiment of the present invention, cells with exceptional IN information (or power information) are detected among all cells, and are sorted according to different types of exceptions of the IN information (or power information) to determine the clock desynchronization of the base station, and the relevant node can take timely actions to prevent the clock desynchronization from affecting communication quality throughout the network.

Figure 10:
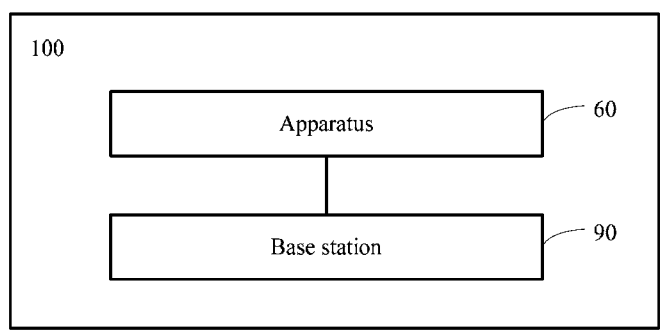
FIG. 10 is a schematic block diagram of a wireless communication system according to an embodiment of the present invention.

FIG. 10 is a schematic block diagram of a wireless communication system 100 according to an embodiment of the present invention. An embodiment of the present invention further provides a wireless communication system 100, which includes the apparatus 60 and/or 90 described above. For brevity, details are not given here any further.

With the wireless communication system according to the embodiment of the present invention, cells with exceptional IN information (or power information) are detected among all cells, and are sorted according to different types of exceptions of the IN information (or power information) to determine the clock desynchronization of the base station, and the relevant node can take timely actions to prevent the clock desynchronization from affecting communication quality throughout the network.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed.

In addition, the displayed or discussed mutual couplings or direct couplings or communication connections may be implemented through some interfaces. The indirect couplings or communication connections between the apparatuses or units may be implemented in electronic, mechanical or other forms.

The units described as stand-alone components above may be separated physically or not; and the components illustrated as units may be physical units or not, namely, they may be located in one place, or distributed on multiple network elements. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, or a network device) to execute all or part of the steps of the method described in the embodiment of the present invention. The storage medium includes: any medium that can store program codes, such as a USB flash disk, a removable hard disk, a read-only memory (Read-Only Memory, ROM), a random access memory (Random Access Memory, RAM), a magnetic disk, or an optical disk.

The foregoing descriptions are merely the specific embodiments of the present invention, but are not limiting the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for determining clock desynchronization, comprising:
   detecting, by a user equipment, a first cell with exceptional interference and noise (IN) information or power information among all cells of base stations throughout a network according to network measurement data sent by a base station, wherein the network measurement data comprises IN information or power information; and;

determining that one or more of the base stations throughout the network and at least the first cell suffer suspected clock desynchronization interference when an uplink fore part of the IN information or power information of at least the first cell encounters an exception.

2. The method according to claim 1, further comprising:
detecting a cell with exceptional IN information or power information among intra-frequency neighbor cells of a base station adjacent to the base station of the first cell according to the network measurement data sent by the base station, and using the cell as a second cell; and sorting different types of exceptions of the IN information or power information occurring in the first cell and the second cell so as to determine a clock desynchronization cell.

3. The method according to claim 1, wherein detecting the cell with the exceptional IN information or power information comprises:
detecting one of the following cells:
(a) a cell where an uplink fore part of IN information or power information encounters an exception, and
(b) a cell where an uplink aft part of IN information or power information encounters the exception.

4. The method according to claim 3, wherein the cell where the uplink fore part of the IN information or power information encounters the exception comprises one of the following cells:
a cell, where a difference between the IN information or power information of a fore symbol in an uplink frame of the cell and the IN information or power information of an aft symbol in the uplink frame exceeds a threshold;
a cell, where a difference between the IN information or power information of an uplink pilot timeslot (UpPTS) of the cell and the IN information or power information of the aft symbol in the uplink frame exceeds a threshold; and
a cell, where a difference between the IN information or power information of an uplink-downlink synchronization guard period (GP) of the cell and the IN information or power information of the aft symbol in the uplink frame exceeds a threshold.

5. The method according to claim 3, wherein the cell where the uplink aft part of IN information or power information encounters the exception comprises one of the following cells:
a cell, where a difference between the IN information or power information of an aft symbol in an uplink frame of the cell and the IN information or power information of a fore symbol in the uplink frame exceeds a threshold;
a cell, where a difference between the IN information or power information of the aft symbol in the uplink frame of the cell and the IN information or power information of an uplink pilot timeslot (UpPTS) exceeds a threshold; and
a cell, where a difference between the IN information or power information of the aft symbol in the uplink frame of the cell and the IN information or power information of an uplink-downlink synchronization guard period (GP) exceeds a threshold.

6. The method according to claim 1, further comprising:
determining that one or more of the base stations throughout the network are in the clock desynchronization, and that at least the first cell suffers the clock desynchronization interference, when an uplink aft part of IN information or power information of at least the first cells encounters the exception.

7. The method according to claim 6, wherein: sorting the first cell and the second cell according to the different types of exceptions of the IN information or power information comprises one of the following:
after determining, that one or more of the base stations throughout the network are suspected of the clock desynchronization, and that the at least one first cell suffers the suspected clock desynchronization interference; the method further comprises: if only the at least one first cell encounters an exception in the uplink fore part of IN information or power information, more than two of the second cells encounter an exception in the uplink aft part of IN information or power information and the more than two second cells belong to different base stations adjacent to a base station of the at least one first cell, determining that the base station of the at least one first cell is in the clock desynchronization and that the at least one first cell is a clock desynchronization cell; and after determining, that one or more of the base stations throughout the network are in the clock desynchronization, and that the at least one first cell suffers the clock desynchronization interference; the method further comprises: if only the at least one first cell encounters an exception in the uplink aft part of IN information or power information, more than two of the second cells encounter an exception in the uplink fore part of IN information or power information in the uplink fore part and the more than two second cells belong to different base stations adjacent to the base station of the at least one first cell, determining that the base station of the at least one first cell is in the clock desynchronization and that the first cell is the clock desynchronization cell.

8. The method according to claim 7, wherein:
after the determining the first cell as the clock desynchronization cell, the method further comprises:
sending a clock source reset command or alarm information to the base station of the at least one first cell when it is determined that the at least one first cell is the clock desynchronization cell.

9. The method according to claim 1, wherein:
before the detecting the cell with the exceptional IN information or power information, the method further comprises:
receiving the alarm information sent by the base station, wherein the alarm information indicates that the base station has detected the clock desynchronization in one or more of the base stations throughout the network.

10. An apparatus for determining a clock desynchronization cell, comprising:
a first detecting unit, configured to detect a first cell with exceptional interference and noise (IN) information or power information among all cells of base stations throughout a network according to network measurement data sent by a base station, wherein the network measurement data comprises IN information or power information; and
a first determining unit, configured to determine that one or more of the base stations throughout the network and at least the first cell suffer suspected clock desynchronization interference when an uplink fore part of the IN information or power information of at least the first cell encounters an exception.

11. The apparatus according to claim 10, further comprising a second detecting unit and a second determining unit, wherein:
the second detecting unit is configured to detect a cell with exceptional IN information or power information among intra-frequency neighbor cells of a base station adjacent to the base station of the first cell according to the network measurement data sent by the base station, and use the cell as a second cell; and
the second determining unit is configured to sort different types of exceptions of the IN information or power information occurring in the first cell and second cell so as to determine a clock desynchronization cell.

12. The apparatus according to claim 10, wherein:
the first detecting unit detects a cell where an uplink fore part of IN information or power information encounters an exception, or a cell where an uplink aft part of IN information or power information encounters an exception, among all cells of the base stations throughout the network, and uses the cell as a first cell; and
the second detecting unit detects a cell where an uplink fore part of IN information or power information encounters an exception, or a cell where an uplink aft part IN information or power information encounters an exception, among intra-frequency neighbor cells of a base station adjacent to the base station of the first cell, and uses the cell as a second cell.

13. The apparatus according to claim 12, wherein:
the cell, which is detected by the first detecting unit or the second detecting unit as encountering an exception in an uplink fore part of IN information or power information, comprises:
a cell, where a difference between the IN information or power information of a fore symbol in an uplink frame of the cell and the IN information or power information of an aft symbol in the uplink frame exceeds a threshold;
a cell, where a difference between the IN information or power information of an uplink pilot timeslot UpPTS of the cell and the IN information or power information of an aft symbol in an uplink frame exceeds a threshold; or
a cell, where a difference between the IN information or power information of an uplink-downlink synchronization guard period GP of the cell and the IN information or power information of an aft symbol in an uplink frame exceeds a threshold.

14. The apparatus according to claim 12, wherein:
the cell, which is detected by the first detecting unit or the second detecting unit as encountering an exception in an uplink aft part of IN information or power information, comprises:
a cell, where a difference between the IN information or power information of an aft symbol in an uplink frame of the cell and the IN information or power information of a fore symbol in the uplink frame exceeds a threshold;
a cell, where a difference between the IN information or power information of an aft symbol in an uplink frame of the cell and the IN information or power information of an uplink pilot timeslot (UpPTS) exceeds a threshold; or
a cell, where a difference between the IN information or power information of an aft symbol in an uplink frame of the cell and the IN information or power information of an uplink-downlink synchronization guard period (GP) exceeds a threshold.

15. The apparatus according to claim 10, wherein the first determining unit is configured to:
determine, that one or more of the base stations throughout the network are in clock desynchronization, and that the at least one first cell suffers clock desynchronization interference, when an uplink aft part of IN information and power information of at least one of the first cells encounters an exception.

16. The apparatus according to claim 15, wherein the second determining unit is configured to:
determine that the at least one first cell is a clock desynchronization cell if an uplink fore part of IN information or power information of only at least one of the first cells encounters an exception, an uplink aft part of IN information or power information of more than two of the second cells encounters an exception, and the more than two second cells belong to different base stations adjacent to the base station of the at least one first cell; and
determine that the at least one first cell is a clock desynchronization cell if an uplink aft part of IN information or power information of only at least one of the first cells encounters an exception, an uplink fore part of IN information or power information of more than two of the second cells encounters an exception, and the more than two second cells belong to different base stations adjacent to the base station of the at least one first cell.

17. The apparatus according to claim 16, further comprising a sending unit, wherein:
the sending unit is configured to send a clock source reset command or alarm information to the base station of the at least one first cell when the second determining unit determines that the at least one first cell is a clock desynchronization cell.

18. The apparatus according to claim 10, further comprising a receiving unit, wherein:
the receiving unit is configured to receive the alarm information sent by the base station, wherein the alarm information indicates that the base station has detected the clock desynchronization in one or more of the base stations throughout the network.

19. A method for determining clock desynchronization, comprising:
obtaining, by a base station in a network, network measurement data, wherein the network measurement data comprises interference and noise (IN) information or power information;
detecting, by the base station, a cell where IN information or power information counters an exception among cells of a current base station according to the network measurement data; and
determining that one or more of base stations throughout the network and at least the detected cell suffer suspected clock desynchronization interference when an uplink fore part of the IN information or power information of at least the detected cell encounters the exception.

20. The method according to claim 19, wherein:
after determining that the one or more of base stations and at least the detected cell suffer the suspected clock desynchronization interference, the method further comprises:
sending alarm information to a network management node, wherein the alarm information indicates that the base station has detected clock desynchronization in one or more of the base stations throughout the network.

21. The method according to claim 19, wherein the detecting a cell with exceptional IN information or power information among cells of a current base station comprises:
   detecting a cell where an uplink fore part of IN information or power information encounters an exception among cells of the current base station, and sorting the detected cell according to different types of exceptions of the IN information or power information, so as to determine that one or more of the base stations throughout the network are suspected of clock desynchronization; or
   detecting a cell where an uplink aft part of IN information or power information encounters an exception among cells of the current base station, and sorting the detected cell according to different types of exceptions of the IN information or power information, so as to determine that one or more of the base stations throughout the network are in clock desynchronization.

22. The method according to claim 21, wherein the cell where an uplink fore part of IN information or power information encounters an exception comprises:
   a cell, where a difference between the IN information or power information of a fore symbol in an uplink frame of the cell and the IN information or power information of an aft symbol in the uplink frame exceeds a threshold; or
   a cell, where a difference between the IN information or power information of an uplink pilot timeslot UpPTS of the cell and the IN information or power information of an aft symbol in an uplink frame exceeds a threshold; or
   a cell, where a difference between the IN information or power information of an uplink-downlink synchronization guard period GP of the cell and the IN information or power information of an aft symbol in an uplink frame exceeds a threshold.

23. The method according to claim 21, wherein the cell where an uplink fore part of IN information or power information encounters an exception comprises:
   a cell, where a difference between the IN information or power information of an aft symbol in an uplink frame of the cell and the IN information or power information of a fore symbol in the uplink frame exceeds a threshold; or
   a cell, where a difference between the IN information or power information of an aft symbol in an uplink frame of the cell and the IN information or power information of an uplink pilot timeslot UpPTS exceeds a threshold; or
   a cell, where a difference between the IN information or power information of an aft symbol in an uplink frame of the cell and the IN information or power information of an uplink-downlink synchronization guard period GP exceeds a threshold.

24. The method according to claim 20, further comprising:
   receiving, by the base station, a clock source reset command or alarm information from the network management node when the network management node determines that the detected cell in the base station is a clock desynchronization cell.

25. A base station for determining clock desynchronization, comprising:
   an obtaining unit, configured to obtain network measurement data, wherein the network measurement data comprises interference and noise (IN) information or power information;
   a detecting unit, configured to detect, according to the network measurement data obtained by the obtaining unit, a cell with exceptional IN information or power information among cells of a current base station:
   a determining unit, configured to determine that one or more of base stations throughout a network and at least the detected cell suffer suspected clock desynchronization interference when an uplink fore part of the IN information or power information of at least the detected cell encounters the exception; and
   a sending unit, configured to send the network measurement data to a network management node.

26. The base station according to claim 25, wherein:
   the sending unit is further configured to send alarm information to the network management node after the determining unit sorts the cell detected by the detecting unit as having exceptional IN information or power information among cells of the current base station according to different types of exceptions of the IN information or power information, so as to determine that one or more of the base stations throughout the network are in clock desynchronization, wherein the alarm information is used to indicate that the base station has detected clock desynchronization in one or more of the base stations throughout the network.

27. The base station according to claim 25, wherein the detecting unit is configured to:
   detect a cell where an uplink fore part of IN information or power information encounters an exception among cells of the current base station, and sort the detected cell according to different types of exceptions of the IN information or power information, so as to determine that one or more of the base stations throughout the network are suspected of clock desynchronization; or
   detect a cell where an uplink aft part of IN information or power information encounters an exception among cells of the current base station, and sort the detected cell according to different types of exceptions of the IN information or power information, so as to determine that one or more of the base stations throughout the network are in clock desynchronization.

28. The base station according to claim 27, wherein the cell detected by the detecting unit as encountering an exception in an uplink fore part of IN information or power information comprises:
   a cell, where a difference between the IN information or power information of a fore symbol in an uplink frame of the cell and the IN information or power information of an aft symbol in the uplink frame exceeds a threshold; or
   a cell, where a difference between the IN information or power information of an uplink pilot timeslot UpPTS of the cell and the IN information or power information of an aft symbol in an uplink frame exceeds a threshold; or
   a cell, where a difference between the IN information or power information of an uplink-downlink synchronization guard period GP of the cell and the IN information or power information of an aft symbol in an uplink frame exceeds a threshold.

29. The base station according to claim 27, wherein the cell detected by the detecting unit as encountering an exception in an uplink fore part of IN information or power information comprises:

- a cell, where a difference between the IN information or power information of an aft symbol in an uplink frame of the cell and the IN information or power information of a fore symbol in the uplink frame exceeds a threshold; or
- a cell, where a difference between the IN information or power information of an aft symbol in an uplink frame of the cell and the IN information or power information of an uplink pilot timeslot UpPTS exceeds a threshold; or
- a cell, where a difference between the IN information or power information of an aft symbol in an uplink frame of the cell and the IN information or power information of an uplink-downlink synchronization guard period GP exceeds a threshold.

30. The base station according to claim 25, further comprising a receiving unit, wherein:

- the receiving unit is configured to receive a clock source reset command or alarm information from the network management node when the network management node determines that the detected cell in the base station is a clock desynchronization cell.

* * * * *